Patented Nov. 16, 1948

2,454,078

UNITED STATES PATENT OFFICE 2,454,078

METHYLOL MELAMINE ETHERS AND THEIR MANUFACTURE

Frank Clifton McGrew, Wilmington, Del., assignor to E. I. du Pont de Nemours & Company, Wilmington, Del., a corporation of Delaware No Drawing. Application April 9, 1941, Serial No. 387,771

11 Claims. (Cl. 260—249.5)

This invention relates to heterocyclic organic compounds, more particularly to six membered rings having three annular nitrogen atoms and more particularly to ethers of trimethylolmelamine.

Melamine, formaldehyde, and an alcohol have been reacted but the products hitherto have been viscous gums of uncertain composition.

This invention has as an object the provision of a process for the preparation of ethers of trimethylolmelamine. A further object is the provision of new textile modifying agents. A still further object is the provision of new compounds. Another object is the provision of new modifying agents for urea formaldehyde resin. A still further object comprises the new resins thus produced. Another object comprises the novel coating, plastic, impregnating, etc. compositions containing the same. Other objects will appear hereinafter.

These objects are accomplished by the following invention wherein trimethylolmelamine is reacted at a temperature not higher than 50° C. in a substantially anhydrous liquid medium in the presence of an acid type catalyst with an alcohol, preferably one containing not more than four carbon atoms, in which alcohol the carbinol carbon is attached to at least one hydrogen atom.

The process of this invention is preferably conducted as follows: To a suspension of trimethylolmelamine in anhydrous liquid medium containing 2-5 parts of a monohydric alcohol for each part of methylol compound, there is added slowly an anhydrous acid condensing agent until sufficient quantity is present to effect the desired esterification reaction. Throughout the reaction, the completion of which may conveniently be determined by the disappearance of the suspended starting material, the mixture is efficiently agitated and maintained at a temperature between 0° and 25° C. After completion of the reaction, the solution is made neutral, e. g. to bromothymol blue, by addition of a sodium alcoholate made from the same alcohol as that used in forming the ether. During this neutralization the temperature is preferably maintained below 25° C. The reaction mixture is then cooled to 0°–10° C. and the sodium salt of the acid catalyst removed by filtration, centrifuging or other suitable means. The filtrate is concentrated to approximately ½ of the initial volume or even until substantially all of the excess solvent is removed, whereupon the crystalline ether separates out either immediately or slowly on standing.

The products of the invention are methylol ethers containing substantially three of the following groups (—NHCH$_2$OR) attached to a triazine ring. In these compounds R is the non-hydroxyl residue of a monohydric alcohol desirably aliphatic, preferably of not more than four carbon atoms and even more preferably hydrocarbon.

The trimethylolmelamine employed may be obtained by treating melamine (2,4,6-triamino-1,3,5-triazine) with formaldehyde. The reaction can conveniently be carried out by slowly heating a mixture of melamine and three mol equivalents of aqueous (37%) formaldehyde at a pH of 6.5–6.8 to a temperature of 72–75° C. and maintaining the reaction at that temperature for five minutes or until a clear solution is obtained. On quickly cooling the reaction mixture to 0–5° C. and holding it at that temperature for several hours, the trimethylol compound separates as a crystalline solid which can be dried for use in this invention by washing with alcohol and acetone. The dry product is stable so long as it is kept cold.

The more detailed practice of the invention is illustrated by the following examples, wherein parts given are by weight. There are of course many forms of the invention other than these specific embodiments.

Example I

In a reaction vessel equipped with agitator and inlet tube extending to near the bottom, a suspension of 50 parts of previously dried trimethylolmelamine in 250 parts of absolute ethanol is cooled to +5° C. and dry hydrogen chloride slowly bubbled through with stirring for approximately one hour. At this point the trimethylolmelamine is all in solution and the reaction mixture is made neutral to bromothymol blue indicator by the dropwise addition of sodium ethoxide solution keeping the temperature below +20° C. The sodium chloride precipitate is removed by filtration and the filtrate concentrated to about ½ the initial volume by directing a stream of dry air over its surface. Upon further cooling to about 0° C., a white crystalline product separates from the concentrated filtrate. Further concentration of the mother liquor at low temperature gives a second crop of product and this process is repeated until no more ether is obtained. The yield is about 65% of theoretical of a white crystalline product readily soluble in alcohol and most common organic solvents but substantially insoluble in water at room temperature. Analysis for the product gives the following results: Calculated for 2,4,6-tris (ethoxymethyl) triazine-1,3,5 ($C_{12}H_{24}O_3N_6$) N=28.0%; found 28.08%. If some of the product is heated to 120° C. for 10 minutes an insoluble, infusible resin results.

Example II

In a reaction vessel similar to that described in Example I except that the inlet tube does not dip below the level of the liquid contained therein, a suspension of 50 parts of trimethylolmelamine in 100 parts of dry methanol is cooled to +5° C. after which there is added dropwise concentrated sulfuric acid during approximately one hour at which time all the trimethylolmelamine is in solution. The reaction mixture is neutralized to bromothymol blue by the dropwise addition of sodium methoxide solution keeping the temperature below 20° C. Sodium sulfate precipitates out and is removed by filtration. The filtrate is then concentrated by blowing dry air over its surface, whereupon some further salt separates out. This is also removed and concentration of the mother liquor continued at low temperature until a thick syrup remains. Because of the greater solubility of the methyl ether in water and the difficulty of excluding absolutely all moisture from the reaction mixture, it is somewhat more difficult to induce crystal formation in this case as compared with the preparation of Example I. However, on permitting the viscous gum to stand several days at +5° C. in a dry atmosphere, fine needles appear in the syrup and eventually most of the product is obtained as a white crystalline compound. The ether is soluble in both methanol and water and resinifies readily on heating at 100° C.

In the process of this invention any monohydric alcohol free from groups, other than the one alcoholic hydroxyl group, reactive with hydroxyl groups and having at least one and preferably at least two hydrogens on the carbinol carbon may be used. The lower alkanols, i.e. those having up to four carbon atoms and preferably the lower primary alkanols are most suitable. However, the monohydric primary or secondary alcohol to be used may be saturated or unsaturated, aliphatic, branch chain, or of the cyclic variety. As has already been stated, the formation of crystalline ethers of trimethylolmelamine proceeds best with lower aliphatic alcohols, such as those containing not more than four carbon atoms. Higher alcohols, however, may also be employed but these are less reactive, and require the use of higher temperatures, or the presence of a diluent solvent during the etherification reaction. Specifically suitable alcohols, in addition to those described in the examples are propanol-1, butanol-1, with propanol-2 and butanol-2 as of secondary importance.

The use of a solvent in this process as a diluent is optional since it generally suffices to employ the alcohol in excess of that required for formation of the ether and this ingredient may conveniently serve as the reaction medium. It may be desired to supplement the alcohol with another organic liquid in order to increase the solubility of the trimethylolmelamine or to increase the efficiency of the agitation of the reaction. For this purpose dioxane, acetone, or ethylene glycol dimethyl ether are suitable and the quantity to be used is not restricted. While the reaction mixture must be substantially anhydrous, water need not be entirely absent but ordinary precautions are to be taken to exclude moisture, including the use of substantially anhydrous raw materials. An anhydrous solvent for the methylol melamine which is essentially not a solvent for the ether may be employed so that the ether on formation would precipitate out presumably crystalline.

The amount of alcohol preferably employed in the process of this invention is in considerable excess of that required by theory to form the tri-substituted ether, but this is not absolutely essential as the process is operable with lesser quantities. If less than the stoichiometrical amount of alcohol is used, the process is operable but the yield of methylol ether based on the methylol compound will obviously be lower. Since the alcohol is usually the cheaper ingredient, it is thus preferable to use it in excess. The exact amount of this excess is not critical, but preferably amounts to 50–300% excess.

In addition to hydrogen chloride and sulfuric acid which the examples describe as suitable condensing catalysts for use in this invention, other acidic materials may be used. For example, hydrogen bromide, phosphoric acid, trichloracetic acid, sulfamic acid, and oxalic acid may be substituted for the catalysts mentioned in the examples. Preferred catalysts are strong acids which exhibit great affinity for water and thus have a dehydrating action. The quantity of acid catalyst used may be varied within wide limits and small concentrations, e. g. 0.001 equivalents based on the methylol compound, are operable, but it is generally more efficient to use higher proportions, preferably from 0.01–0.5 equivalents based on the methylol compound.

The temperature at which the reaction is conducted must be maintained sufficiently low to avoid decomposition of both the trimethylolmelamine and the ether. With an acid-type catalyst present, decomposition and the formation of an insoluble resin is appreciable at temperatures much above 50° C. The preferred range for the reaction, therefore, is 0°–25° C. with the operable range as high as 50° C.

The apparatus in which the reaction is conducted may be of various designs but preferably should be constructed of materials resistant to the acid catalyst. Though not absolutely essential, it is also desirable to make provision for thorough agitation of the reactants and the exclusion of moisture. Either subatmospheric, atmospheric, or superatmospheric pressures may be employed.

The products of this invention, particularly the methyl and ethyl ethers of trimethylolmelamine, resinify readily on heating. They are, therefore, useful agents in moldings, plastic compositions, and in textile finishes. The resin-forming reaction may be employed with the trimethylol ether alone or in compositions in which the ether is mixed with polyhydric compounds such as cellulose, starch, carbohydrates, and their derivatives. The products are also useful as modifying agents in alkyd or urea-formaldehyde resins where they help to decrease the moisture sensitivity of the resin. The products of this invention are particularly useful as ingredients in crush-proofing and dye fixing compositions in the treatment of textiles. The methods used for applying these agents are, in general, quite simple since heat alone is usually sufficient to produce resinification. The agents may be impregnated from water solution onto the textile which is then squeezed, dried and heated at an elevated temperature, i. e. 100°–150° C., e. g. by ironing, calendering or the like. Although acid catalysts may be employed to hasten the reaction, a particular advantage for these products is that the presence of such catalysts is not mandatory. This ability to resinify in the absence of an acid catalyst means that degradation of the cellulose or other substances associated with the ethers of trimethylolmelamine is held to a minimum. The temperatures best suited for producing resinification of these products is in the range of 50°–150° C. with choice of the exact temperature depending on the rate at which it is desired to complete formation of the resin or cross linked product.

As specific illustrations of how the ethers of trimethylolmelamine may be used in the improvement of textiles and fibers made from cellulose or a cellulose derivative, the following examples are given:

(a) *Improving the crush resistance of a rayon fabric.*—Viscose rayon fabric is impregnated with a 5% aqueous solution of the trimethyl ether of trimethylolmelamine containing 0.2% of ammonium chloride as catalyst. The impregnated cloth is run through squeeze rolls adjusted so as to leave approximately 100% of the impregnating solution in the cloth. The squeezed cloth is dried at room temperature and then given a short (5 minute) bake at 140° C. in an oven. After washing with a soap solution and again drying, the fabric is found to have acquired a considerable degree of crush resistance in comparison with the original.

(b) *Insolubilizing a cellulose derivative film.*—To a solution containing 25 parts of ethylcellulose in a mixture of 80% benzene and 20% ethyl alcohol there is added 0.75 part of crystalline triethyl ether of trimethylolmelamine. From this solution there is formed a film by spreading on a glass plate and evaporating the solvent. This film is then baked for 21 hours at 105° C. whereupon it is found to be substantially insoluble in the benzene-alcohol solvent and completely insensitive to carbon tetrachloride.

The above description and examples are intended to be illustrative only. Any modification of or variation therefrom which conforms to the spirit of the invention is intended to be included within the scope of the claims.

What is claimed is:

1. A crystalline monomeric ether of trimethylolmelamine with a monohydric alcohol, said alcohol having at least one hydrogen on the carbinol carbon.

2. A crystalline monomeric ether of trimethylolmelamine with a monohydric aliphatic alcohol, said alcohol having at least one hydrogen on the carbinol carbon.

3. A crystalline monomeric ether of trimethylolmelamine with a monohydric saturated aliphatic alcohol, said alcohol having at least one hydrogen on the carbinol carbon.

4. A crystalline monomeric triether of trimethylolmelamine with a lower alkanol having at least one hydrogen on the carbinol carbon.

5. A crystalline monomeric triether of trimethylolmelamine with a lower primary alkanol.

6. Crystalline monomeric tris methoxymethylmelamine.

7. Crystalline monomeric tris ethoxymethylmelamine.

8. A crystalline monomeric etherified methylol melamine having at least three ether groups.

9. A crystalline monomeric ether of trimethylolmelamine with a monohydric alcohol.

10. A monomeric etherified methylol melamine having at least three ether groups.

11. A solution of a monomeric etherified methylol melamine having at least three ether groups.

FRANK CLIFTON McGREW.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,223,327 | Light | Nov. 26, 1940 |

FOREIGN PATENTS

| Number | Country | Date |
|---|---|---|
| 468,677 | Great Britain | ---- |
| 486,519 | Great Britain | 1938 |
| 486,577 | Great Britain | 1938 |

OTHER REFERENCES

Bulletin of Chem. Soc. of Japan, vol. II, No. 3, pp. 248, 261.